United States Patent [19]

Blain et al.

[11] Patent Number: 4,458,982
[45] Date of Patent: Jul. 10, 1984

[54] OPTICAL SCANNING SYSTEM INCLUDING A ROTATABLE DRUM WITH MIRRORS AND INCLUDING A ROTATABLE OPTICAL SHUTTER

[75] Inventors: William Blain; Nicolas L. Brignall, both of Edinburgh, Scotland

[73] Assignee: Ferranti plc, Cheshire, England

[21] Appl. No.: 361,259

[22] Filed: Mar. 24, 1982

[30] Foreign Application Priority Data

Mar. 31, 1981 [GB] United Kingdom ............... 8110109

[51] Int. Cl.³ ............................................. G02B 27/17
[52] U.S. Cl. ..................................... 350/6.7; 350/274; 250/236
[58] Field of Search ................ 350/6.7, 6.5, 6.6, 6.8, 350/6.9, 6.91, 486, 274, 273, 266, 1.1; 358/202, 206, 208; 250/236

[56] References Cited

U.S. PATENT DOCUMENTS

| 3,024,449 | 3/1962 | Guerth | 350/6.7 |
| 3,219,642 | 11/1965 | Killpatrick | 350/274 |
| 3,543,183 | 11/1970 | Heimann | 350/266 |
| 3,637,281 | 1/1972 | Gull | 350/6.7 |
| 3,765,742 | 10/1973 | Walles | 350/273 |
| 3,804,976 | 4/1974 | Gard | 358/113 |
| 3,813,146 | 5/1974 | Buvah et al. | 350/274 |
| 4,019,804 | 4/1977 | Collier | 350/6.8 |

FOREIGN PATENT DOCUMENTS 7709642 6/1979 Sweden ................ 350/274

Primary Examiner—Jon W. Henry
Attorney, Agent, or Firm—Kerkam, Stowell, Kondracki & Clarke

[57] ABSTRACT

An optical scanning system includes scanning means arranged to scan an object field and comprising, in one form, a rotatable drum (10) carrying a plurality of pairs of mirrors (12, 13). A detector (21) is provided which is sensitive to optical radiation directed on to it by the scanning means. Means, such as telescopes (17, 22) collect radiation from at least two fields of view for presentation to the object field of the scanning means. Optical switching means are provided so that radiation reaches the detector (21) from each field of view in turn. The switching means may be an optical shutter (14) having reflective regions (15) and transparent regions (16).

8 Claims, 4 Drawing Figures

OPTICAL SCANNING SYSTEM INCLUDING A ROTATABLE DRUM WITH MIRRORS AND INCLUDING A ROTATABLE OPTICAL SHUTTER

This invention relates to optical scanning systems and particularly to such systems incorporating a detector and arranged to scan a field of view.

Scanning systems are known in which a rotating drum carries a plurality of mirrors, each mirror being arranged to direct optical radiation received from the field of view on to a sensitive detector. Such a system will scan the field of view in one direction, and further means may be provided for scanning the field of view in another, usually perpendicular, direction. British Pat. No. 1,292,876 describes such an optical system. Other scanning arrangements may be used. For example, it is possible to use a pair of mirrors each of which scans in a different direction. The purpose of any of these systems is to scan a complete field of view so that an image of that field may be produced.

If some form of telescope is used to collect radiation from the field of view, then the angular dimensions of that field will be very much less than may be accommodated by the action of the rotating drum.

It is an object of the invention to improve the operation of an optical scanning system of the type described above by making use of more of the available field of view.

According to the present invention there is provided an optical scanning system which includes scanning means arranged to scan an object field, detector means sensitive to optical radiation directed on to it by the scanning means, means for collecting radiation from at least two fields of view for presentation to the object field of the scanning means, and optical switching means arranged to ensure that radiation is directed on to the detector means from each of the fields of view in succession such that the detector means is time-shared between the separate fields of view.

Also according to the invention the scanning means may comprise a rotatable drum carrying a plurality of pairs of mirrors arranged with the two mirrors, of a pair disposed substantially at right angles to one another with the line of intersection of the planes containing the two mirrors substantially perpendicular to the axis of rotation of the drum.

Preferably the optical switching means includes a rotatable optical shutter.

The expression "optical radiation" is intended to cover electromagnetic radiation in the visible, ultra-violet and infra-red wavebands.

An embodiment of the invention will now be described, by way of example, with reference to the accompanying drawings, in which.

Figure 1:
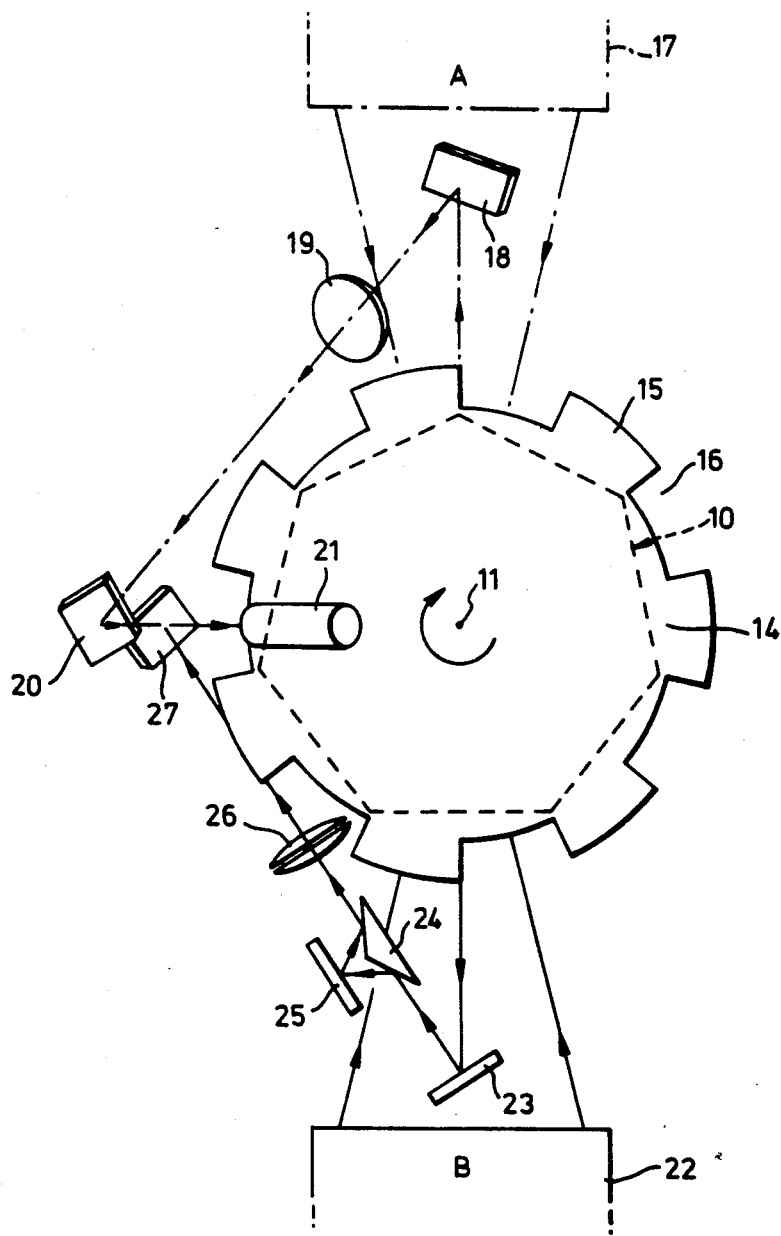
FIG. 1 is a plan view of an optical scanning system including a rotating drum scanner.
Figure 2:
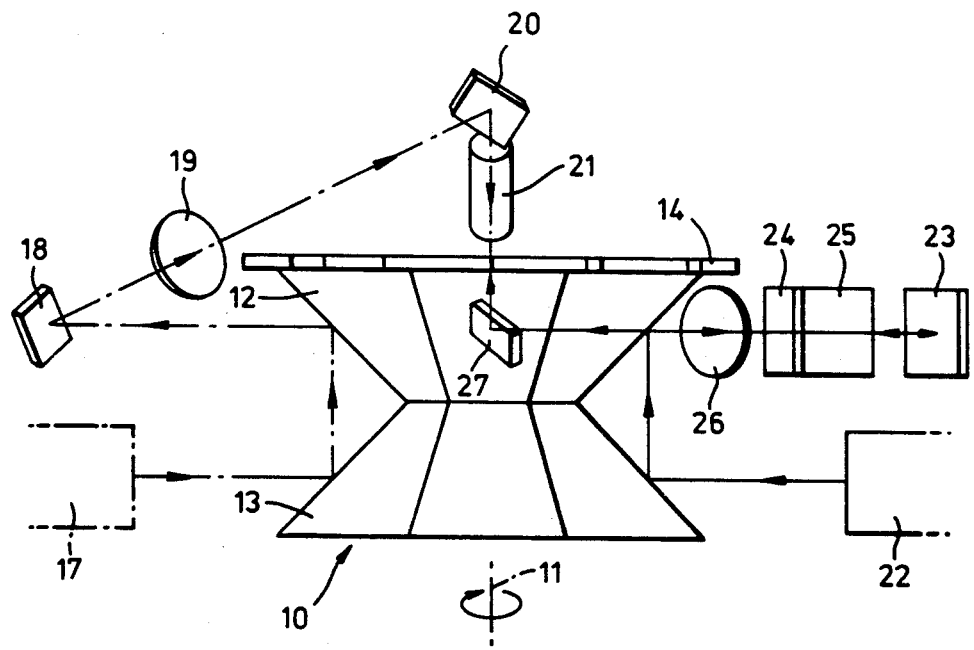
FIG. 2 is a side view of the system of FIG. 1.

Referring now to FIGS. 1 and 2, the optical system includes a drum 10 rotatable about an axis 11 and comprising a seven-sided polygon in which each side consists of two faces 12 and 13 inclined at right-angles to one another as shown in FIG. 2. The line of intersection of the planes containing the two faces are, for each pair of faces, perpendicular to the axis of rotation of the drum. The faces are optically reflecting surfaces.

Attached to one end surface of the drum 10 is a shutter 14. This is of greater diameter than the drum and comprises, for each face of the drum, a portion 15 which reflects radiation and a portion 16 which is transparent to radiation. As shown in FIG. 1, this may be achieved by making the reflecting portions of greater radius than the other portions.

The system shown in the drawings accepts radiation from two fields of view. Radiation from a field of view A is collected by means such as a telescope 17 and is directed onto the lower one of a pair of mirrors as shown in FIG. 2, in a direction generally perpendicular to the axis of rotation 11. From the mirror 13 the radiation is directed on to the upper mirror 12 of the pair, and thence away from the drum. A mirror 18 reflects the radiation through a lens 19 towards a further mirror 20, by which it is directed towards a radiation-sensitive detector 21.

In the same way, radiation from a field B is collected by a second telescope 22 and directed on to the lower mirror 13 of another pair. From the mirror 13 radiation passes to the upper mirror 12 and away from the drum towards a mirror 23. From this mirror the radiation passes to an optical rotation system comprising a prism 24 and a mirror 25, the purpose of which will be described later. Radiation from the prism 24 then passes through lens 26 on to a mirror 27 which directs the radiation towards the detector 21.

Figure 3A:
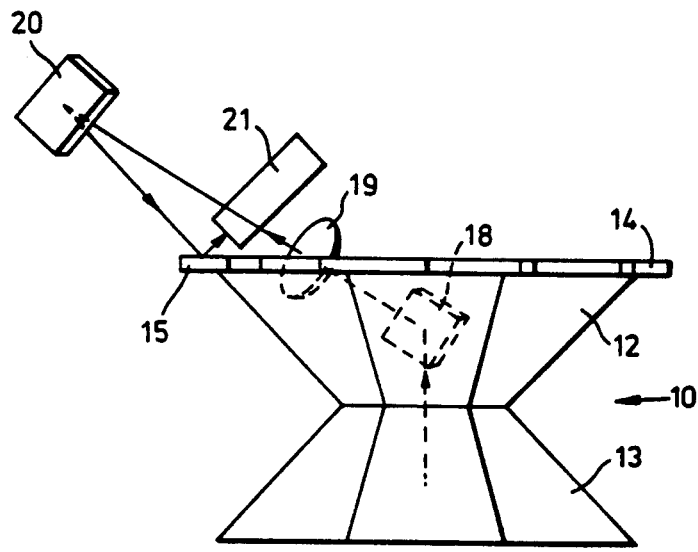
FIG. 3 shows two end views of the system of FIG. 1 to illustrate the operation of the system.
Figure 3B:
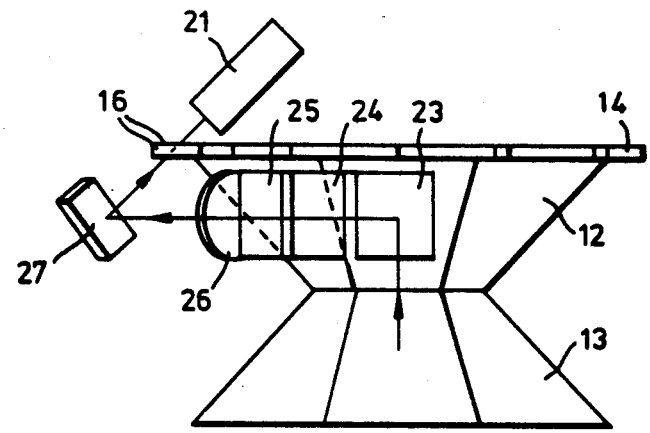

The mechanism by which a rotating prism scans a field of view is well known, and need not be described here. The operation of the system described with reference to FIGS. 1 and 2 will now be described with reference also to FIG. 3. The telescopes 17 and 22 and the object field of the scanning drum are omitted for clarity, and it is assumed that the observer occupies the position of the telescope. Referring now to FIG. 3(a), radiation from the telescope 17 strikes mirrors 13 and 12 in succession and is then directed by mirrors 18 and 20 on to the reflecting surface 15 of the shutter 14. This surface reflects the radiation on to the detector 21, and lens 19 focusses the radiation on to the sensitive area of the detector. As the drum 10 and shutter 14 rotate the detector effectively scans across the field of view. When the rotation is such that the projection 15 is no longer in the path of the radiation, then this radiation from field of view A is no longer directed on to the detector. Instead, radiation from the other field of view B is directed on to the detector as is illustrated by FIG. 3(b). As already described, this radiation passes through the telescope 22 on to the drum, and then via mirror 23, prism 24 and mirror 25, lens 26 and mirror 27 to the detector.

After further rotation of the drum 10 and shutter 14, a reflecting projection 15 cuts off radiation from field of view B and directs radiation from field of view A on to the detector again. Hence each face of the drum is shared between the two fields of view.

Any electrical or electronic circuitry associated with the scanning system is not described in this specification, since it is well known to apply the detector output to some form of display. It is a simple matter to provide signal switching operating in synchronism with the optical switching so that the radiation received from each source may be displayed on a separate display.

In the drawings the two fields of view have been shown on opposite sides of the drum. This is a possible arrangement, but others are equally suitable, though radiation from each field of view must be applied to a difference pair of mirrors 12 and 13. The two fields of view may be distinct or may overlap as required. It is, for example, possible to use two telescopes of different magnification so that one field of view may be an enlarged view of part of the other field. Equally, the same field may be viewed using different optical characteristics, such as different optical filters in each optical path.

In the embodiment described above the shutter 14 is attached to the drum 10. Since synchronism between shutter and drum is necesary, this is the easiest way to achieve this result. However, the two may be separate, and may be separately driven at the same speed. Equally, the two sets of mirrors 12 and 13 may be separate, being driven at the same speed about the axis 11.

If the detector 21 is a point detector, then a scan such as described above will cover only a line of each field of view. In order to scan the entire field it is necessary to do one of two things. The detector 21 may comprise an elongated sensitive area made up from a linear array of separate areas such that the entire field is viewed in one scan. Alternatively the field may be scanned optically in a direction perpendicular to the scan produced by rotation of the drum. This may be done by introducing into each optical path from the telescope 17 or 22 a scanning mirror pivoted about an axis and rotatable through the necessary angle. Alternatively, successive pairs of mirrors on the drum 10 may be tilted with respect to one another by a small angle. All of these scanning techniques are known, as are those using arrangements of mirrors without the rotating polygonal drum.

The optical rotator comprising prism 24 and mirror 25 is not necessary if the detector 21 is a point detector. It is more usual, however, to use an array of detectors which are scanned in either a serial or a parallel manner, in such a case it is possible that radiation from the two fields shown in the drawings will follow slightly different paths over the array of detectors.

The optical compensator is necessary to ensure that, at all times, images produced from the two fields are scanned in a direction parallel to the array of detectors if they form a serial array, or perpendicular to the array if they form a parallel array.

The embodiment described relates to the time-shared scanning of two fields of view. This could be extended, though the optical switching arrangements would be more complex. However, the single shutter described above could be replaced by multiple synchronised shutters each dealing with radiation from a different field of view. In such a case the shutters may comprise alternate transparent and opaque regions. As explained, earlier, the limit is imposed by the angle of each field of view relative to the overall angle of view of each pair of mirrors on the drum.

The shutter 14 may be formed from a disc having alternate reflecting and transparent regions. Such an arrangement would produce less windage when rotated at high speed than the "toothed" construction described earlier.

If a scanning drum is used then it may have any suitable number of faces. It is known for the drum to be made in two parts with one mirror of each pair on one part and the other mirror on the other part.

What we claim is:

1. An optical scanning system which includes scanning means arranged to scan an object field and comprising a rotatable drum carrying a plurality of pairs of mirrors arranged wtih the two mirrors of a pair disposed substantially at right angles to one another with the line of intersection of the planes containing the two mirrors substantially perpendicular to the axis of rotation of the drum, detector means sensitive to optical radiation directed on to it by the scanning means, means for collecting radiation from at least two fields of view for presentation to the object field of the scanning means, and a rotatable optical shutter rotating in synchronism with the rotatable drum to ensure that radiation is directed on to the detector means from each of said at least two fields of view in succession such that the detector means is time shared between separate fields of view.

2. A system as claimed in claim 1 in which the means for collecting radiation from each field of view comprises an optical telescope.

3. A system as claimed in claim 1 in which the rotatable optical shutter carries alternate reflecting and transparent regions.

4. A system as claimed in claim 1 in which the rotatable optical shutter is attached to and rotatable with the drum.

5. A system as claimed in claim 1 in which the rotatable optical shutter carries alternate reflecting and transparent regions.

6. A system as claimed in claim 1 in which the detector means comprises an array of radiation-sensitive areas.

7. A system as claimed in claim 1 in which the detector means is sensitive to infra-red radiation.

8. A system as claimed in claim 1 which includes electrical circuit means having signal switching means operable to synchronism with the rotatable optical shutter to direct signals representing radiation received from each separate field of view to separate display means.

* * * * *